Figure 1:
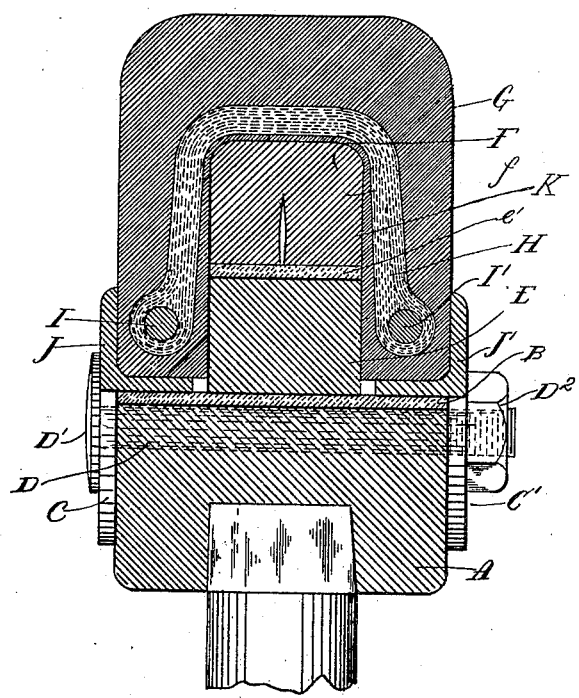

No. 696,746. Patented Apr. 1, 1902.
C. A. PETTIE.
VEHICLE TIRE.
(Application filed July 2, 1901.)
(No Model.) 3 Sheets—Sheet 1.

WITNESSES:
Paul C. Haan,
Nathan B. Chaday.

INVENTOR
Charles A. Pettie,
BY J. W. Barker
ATTORNEY

No. 696,746. Patented Apr. 1, 1902.
C. A. PETTIE.
VEHICLE TIRE.
(Application filed July 2, 1901.)
(No Model.) 3 Sheets—Sheet 2.

WITNESSES.
Paul C. Haan
Nathan B. Chadsey

INVENTOR
Charles A. Pettie,
By J. W. Barker
ATTORNEY

THE NORRIS PETERS CO., PHOTO-LITHO., WASHINGTON, D. C.

No. 696,746. Patented Apr. 1, 1902.
C. A. PETTIE.
VEHICLE TIRE.
(Application filed July 2, 1901.)

(No Model.) 3 Sheets—Sheet 3.

WITNESSES
Paul C. Hoaan
Nathan B. Chadsey

INVENTOR
Charles A. Pettie
By F. W. Barker
ATTORNEY

UNITED STATES PATENT OFFICE.

CHARLES A. PETTIE, OF BROOKLYN, NEW YORK.

VEHICLE-TIRE.

SPECIFICATION forming part of Letters Patent No. 696,746, dated April 1, 1902.

Application filed July 2, 1901. Serial No. 66,871. (No model.)

*To all whom it may concern:*

Be it known that I, CHARLES ANDREW PETTIE, a citizen of the United States, residing at Brooklyn, in the county of Kings and State of New York, have invented a new and useful Improvement in Vehicle-Tires, of which the following is a specification.

This invention relates to rubber tires for vehicles; and it comprises certain features of improvement which are equally applicable to tires of both the pneumatic and solid types, together with other features particularly designed for solid tires alone.

The several elements included in my invention may be briefly summarized as follows: first, an improved cover for a tire to inclose either a flexible core, as of rubber, or a pneumatic cushion, said cover being composed of rubber reinforced with fabric, a pair of metal flanges inclosing the inner circumferential edges of said cover, a bolt-head and nut to retain the flanges upon the steel tire and felly, and a pair of metal strands extending circumferentially through the substance of the cover at points therein flanked by the metal flanges; second, the employment within a cover, as above described, of a partial core or buffer encircling the metal tire and being preferably composed of a series of sections of wood or other solid substance secured against a surrounding strip of fabric or the like, the space within the cover exterior to said partial core being supplied with either a pneumatic tube or other flexible cushion; third, the employment with a cover, as above described, of a flexible core portion composed of alternate layers of rubber and fabric, together with fabric arranged within the cover to afford the core portion and cover a substantial homogeneity of structure and to prevent separation of the rubber layers; fourth, the employment in a tire of a core portion of wood or the like arranged centrally about the metal tire, a sheet of fabric laid thereupon, a rubber tire built upon and about said core, and fingers or integral lateral strips extending from said sheet of fabric, lapped at different distances within the substance of the rubber tire to strengthen same, whereby the rubber is at no point wholly separated from itself; fifth, in a tire the arrangement of the fabric webbing therein with its warp and weft strands running respectively longitudinally and transversely of the tire.

The invention further includes the combination and arrangement of parts, substantially as will be described hereinafter, illustrated in the drawings, and specifically pointed out in the claims.

Figure 2:
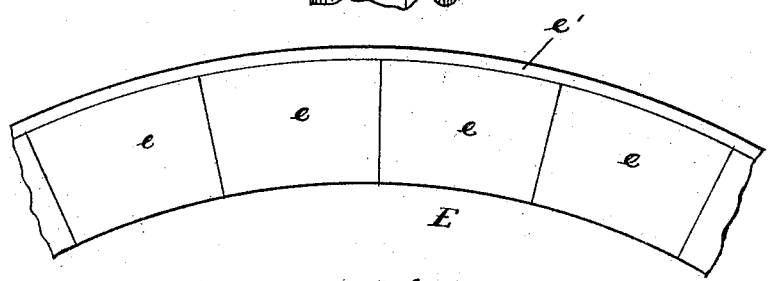
Figure 3:
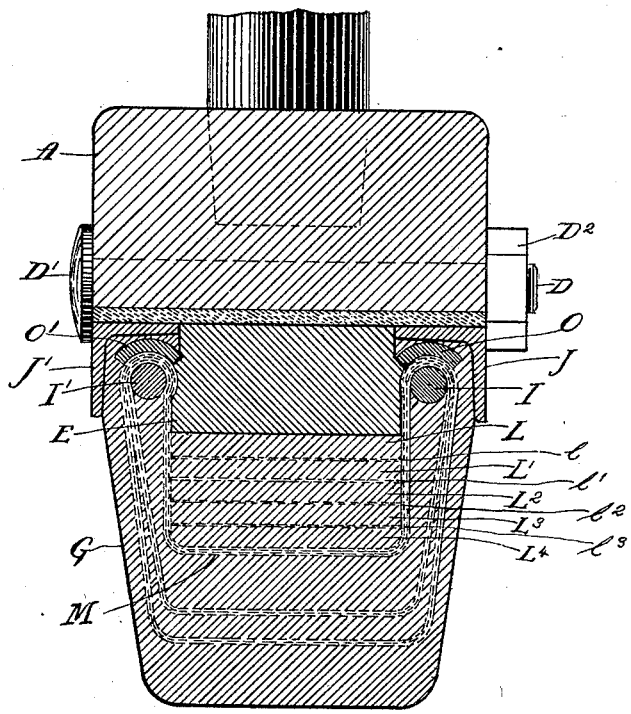
Figure 5:
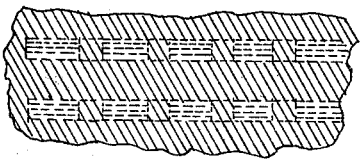
Figure 4:
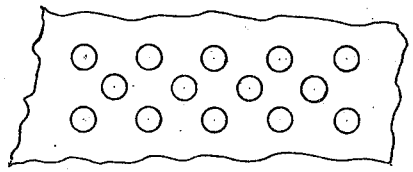
Figure 6:
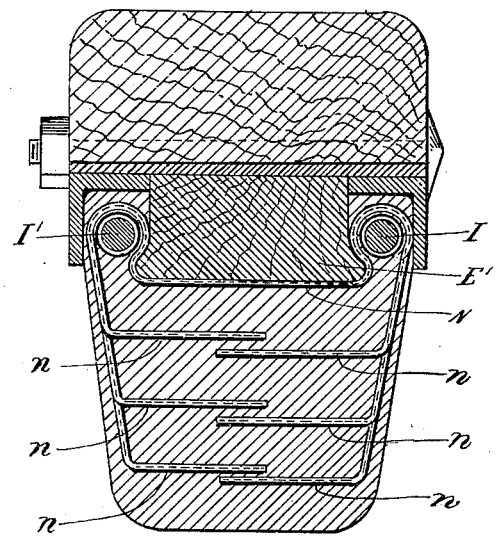
Figure 7:
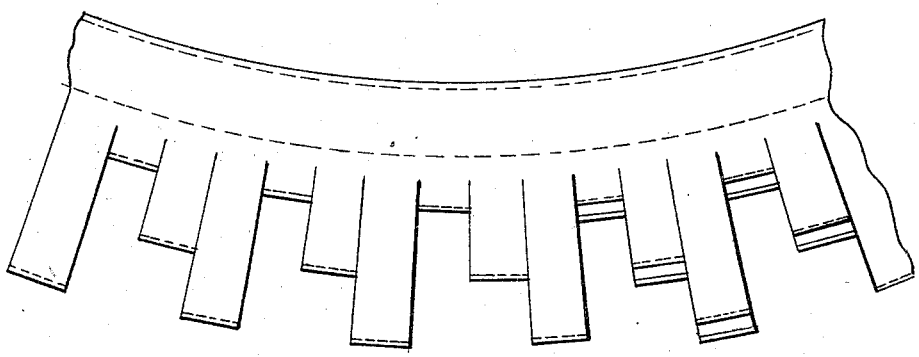

In the drawings accompanying this specification, Figure 1 is a cross-section of a tire, showing the general arrangement of the parts thereof. Fig. 2 is a detail view, in longitudinal section, of a portion of the partial core or buffer employed. Fig. 3 is a similar sectional view to that shown in Fig. 1, but including the means for affording homogeneity of structure in a solid tire. Figs. 4 and 5 are detail views showing the manner of fabric reinforcement employed. Fig. 6 is a sectional view of a modified form of structure, and Fig. 7 is a detail of a fabric employed therewith.

Adverting first to Figs. 1 and 2, A indicates the wooden felly of a tire, upon which is superposed a metal tire B, washers C C' flanking said felly and metal tire and being united by a bolt D, having head D' and nut $D^2$. Arranged centrally about metal tire B is a core portion or buffer E, the same being either an integral hoop or preferably composed of a series of segments $e$ in like form. Said core portion or buffer is preferably of wood, but may obviously be composed of other suitable solid substance. When in form of a series of separate segments, these are placed side by side to comprise a circle and are secured at their outer surface to a strip of fabric or other suitable material $e'$. Extending circumferentially about said core portion or buffer is, in case of a solid tire, a strip or body of rubber or other compressible material and which I may term the "main" core. Said main core is preferably provided with a central vertical slit $f$, which serves the function during compression of a tire under the load of permitting a more elastic yield to said core portion.

The side walls of the partial core and main core are in alinement to provide uniformity of structure. Inclosing said core portions is a combined tread and cover G, the same consisting of rubber or suitable amalgam having internal reinforcement of fabric webbing, as indicated at H.

Within the cover G at points near its inner edges are disposed binding strands or wires I I', the latter extending circumferentially about the cover and serving to hold it securely against creeping. To prevent lateral displacement, I provide circular flanges J J', L-shaped in cross-section, said flanges being disposed upon the metal tire B at the opposite sides thereof, also extending over the washers C C', and together comprising a trough to receive the inner portions of the cover G. The vertical plates of flanges J J' embrace horizontally that portion of the cover G containing the strands or wires I I', whereby the danger of lateral displacement of said cover is entirely avoided.

It will be noticed that the bolt-heads D' and nuts D² extend over a portion of the vertical surfaces of the flanges J J', thereby retaining the latter securely in the position referred to.

The fabric H, which is included in the structure of the cover G, is arranged in a suitable number of plies to afford the desired strength, and it is passed about the strands or wires I I', as indicated, to enable said members to become integral parts of said cover.

Instead of the main core F, used in the case of a solid tire, I may employ an ordinary pneumatic tube with or without fabric reinforcement or, in fact, any other desirable form of cushion. I have indicated such pneumatic tube by the dotted line K.

Now, referring to Fig. 3, which includes the main elements already described excepting the main core F and which pertains only to the solid form of tire, I will premise that the features of invention herein shown include means of binding a body or mass of rubber to prevent it from peeling or clipping off in large chunks—in other words, to preserve its homogeneity of structure under all conditions of usage. Superposed upon the partial core or buffer E are a series of layers or strips of rubber, as L L' L² L³ L⁴, the number thereof, however, being immaterial and provided for according to the dictates of experience, the amount of load to be carried, and other conditions. Intermediate said layers I place strips, as l l' l² l³, of fabric or the like to add strength to the mass. Said strips l l' l² l³, or as many of them as may be used, may be perforated, as indicated in Figs. 4 and 5, thereby permitting the vulcanizing process to cause the rubber layers to become integrally united therethrough. The webbing M, provided in the cover portion of this modified form, extends vertically from the top of the several plies of rubber and fabric referred to and about the strands or wires I I' and thence is passed about within the substance of the cover and tread portions to reinforce the same.

I find it desirable to provide beds or seats of fabric, as O O', for the strands or wires I I' on account of the wear occurring at such points.

It will be seen that because the cover ends, including their binding-wires, are embraced between the solid partial core and the flanges J J' the security of the connection between the tire and wheel is absolute, while at the same time the tire may be readily put on or taken off.

In the modification shown in Figs. 6 and 7 I provide a modified form of core or buffer of wood or the like, which is indicated by E', the same having the outturned edges d d' to partially embrace the strands or wires I I'. Circumferentially upon said core or buffer E' I place one or a number of plies of fabric, as N, the same being of greater width than that of the core or buffer E'. Said extra width at each side is cut into a series of strands, strips, or fingers, as n. The lateral extensions of fabric N are passed respectively about the strands or wires I I', as indicated, and thence are continued within the substance of the rubber tire, the strips or fingers n being provided in order that members thereof may be laid at intervals transversely within the substance of the tire. In practice I take several of these fingers or strips from opposite sides of the fabric and lay them across the rubber at a certain predetermined distance from the core E' with their ends lapping each other. Other fingers are similarly laid at another predetermined point, and similarly a series of layers of fabric strips are provided throughout the rubber to give it the desired strength and homogeneity of structure. In this manner a single sheet or several sheets of fabric laid upon the wooden core may be interspersed throughout the entire body of a rubber tire, enabling it effectually to bind the whole mass by vulcanization.

In explanation of the importance of the above-described feature of my invention I may remark that in the practical usage of solid rubber tires the rubber is apt to become disengaged from its separating-strips of fabric, because the rubber expands under the load, wherefore it is my purpose to compose my tire of a continuous mass of rubber capable of a continuous expansion and contraction throughout its entire substance, the reinforcing and binding strips of fabric being so arranged, as described, that they do not interrupt the continuity of the rubber.

A further feature of invention is that the fabric employed by me is so cut and arranged that its warp and weft strands run respectively longitudinally and transversely of the tire instead of in the usual diagonal arrangement of such strands, the purpose of this new arrangement being to afford the maximum degree of strength of fabric lengthwise and crosswise of the tire.

I claim—

1. The combination in a tire of a circular base portion, a solid core or buffer thereupon, and a cushion; together with a cover, binding-wires embedded therein, and lateral flanges, said flanges and the solid core embracing the cover edges about the binding-wires.

2. In a vehicle-tire, in combination, a felly, a metal tire therefor, a solid core composed of a series of abutting sections, a flexible uniting-strip for said sections, a cushion arranged about said core, a cover, binding-wires circularly disposed near the free edges of said cover, and fabric reinforcement therefor; together with lateral flanges inclosing the cover and means for holding said flanges in place.

3. In a vehicle-tire, in combination, a felly, a metal tire encircling same, a sectional solid core portion about said metal tire, a cover, retaining wires or strands therefor, alternate layers of rubber and fabric arranged in said cover, and extending about the retaining wires or strands, lateral flanges for the tire, and means for holding the flanges in position.

In testimony whereof I have signed my name to this specification, in the presence of two subscribing witnesses, this 12th day of June, 1901.

CHARLES A. PETTIE.

Witnesses:
NATHAN B. CHADSEY,
F. W. BARKER.